Figure 1:
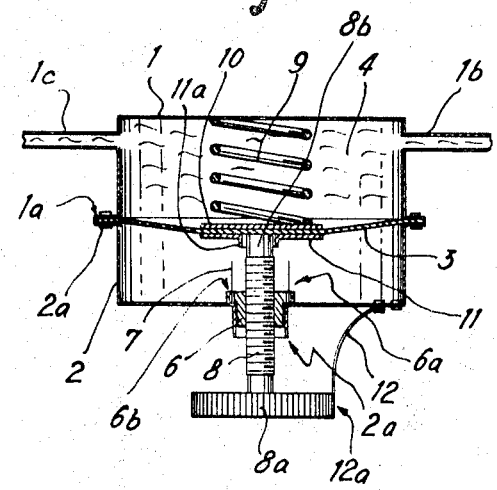

United States Patent

[11] 3,563,275

[72] Inventor  Jules Antonin Sombardier
              Pau, France
[21] Appl. No. 725,305
[22] Filed     Apr. 30, 1968
[45] Patented  Feb. 16, 1971
[73] Assignee  Societe dite: Projecteurs Cibie
              Bobigny (Seine St.-Denis), France
              a company of France
[32] Priority  May 3, 1967
[33]           France
[31]           105,165

[54] BALANCING AND CONTROL DEVICES FOR HYDRAULIC CIRCUITS
3 Claims, 2 Drawing Figs.
[52] U.S. Cl. ............................................. 138/30;
                                                   137/593
[51] Int. Cl. ............................................. F16l 55/04
[50] Field of Search ..................................... 138/30;
                                          137/593; 239/89, 96

[56]                    References Cited
                    UNITED STATES PATENTS
1,765,930   6/1930   McGonegal ............... 138/30
2,893,434   7/1959   Ballard ..................... 138/30
3,130,751   4/1964   Lapas ....................... 138/30
3,237,715   3/1966   Peters ...................... 138/30X
3,366,144   1/1968   Durst ....................... 138/30

Primary Examiner—Herbert F. Ross
Attorney—Ward, Mc Elhannon, Brooks & Fitzpatrick ABSTRACT: A balancing and control device, for use in a hydraulic circuit, which can be adjusted to compensate for loss of hydraulic fluid by leakage, evaporation etc. The device comprises a casing which, together with a diaphragm, forms an enclosure. The enclosure is connected to a hydraulic circuit. The position of the diaphragm and thus the volume of the enclosure is adjustable by adjusting screw means against which the diaphragm is urged by spring means.

BALANCING AND CONTROL DEVICES FOR HYDRAULIC CIRCUITS

The present invention relates to a balancing and control device for hydraulic circuits.

Hydraulic control circuits are in widespread use in technology, for the purpose of transmitting a motion or a displacement from a control element to a controlled element. In particular, systems for automatic adjustment of the orientation of the headlights of a self-propelled vehicle as a function of its positioning are already known, in which the relative motion between the sprung and unsprung portions of the vehicle is transmitted to the headlights to adjust their direction around horizontal axes, in other words their vertical orientation.

Systems of this nature have been described, for example, in the French Pat. Nos. 1,358,632, 1,409,173, 1,438,576, 1,458,674, owned by the applicants.

In many instances, and specifically for the systems for directional control over the headlights of vehicles, the hydraulic circuit should be particularly precise in action, that is to say that the appropriate correspondence established initially between the orientation of the headlights and the riding position of the vehicle, remains appropriately constant in the long run, without accidental maladjustment. In practice, it has been noted that even when employing closed and fundamentally sealed hydraulic circuits, leaks, seepage and evaporation intervened at times, causing a reduction in the quantity of liquid of the circuits, thereby progressively diminishing the precision of the control. The precision of the control is also affected by temperature changes.

The present invention has the object of eliminating these shortcomings, and to this end it relates to a balancing device intended to be connected to a hydraulic circuit to allow the volume of the enclosure containing the hydraulic transmission liquid to be compensatorily varied under the action of a control element operated manually or automatically. A device of this nature may compensory installed in series with the hydraulic circuit, that is to say between the control element and the controlled element, or in parallel with the same.

The present invention consists in a balancing device for a hydraulic circuit comprising a casing having a diaphragm which completes a sealed enclosure within the casing, said enclosure being adapted to be connected to a hydraulic circuit, the position of the diaphragm and thus the volume of the enclosure being adjustable by adjusting screw means against which the diaphragm is urged by spring means.

Preferably, the adjusting screw means is engaged in a thread borne by the casing.

The screwthread may be that of a nut secured immovably on the side of the case. In more highly developed forms of embodiment, the nut is arranged to slide at right angles to the diaphragm, the loading spring always tending to thrust the screwnut combination back until a peripheral shoulder or step of the nut comes into abutment against the internal surface of the case. In these circumstances, screwing the adjusting screw in the nut allows of precise adjustment of the compensatory device, whereas the displacement of the screwnut aggregate may be exploited to control the hydraulic circuit. The device according to the invention may thus be considered as a device for control of the hydraulic circuit, with an incorporated adjusting system.

In the accompanying drawings:

FIG. 1 is a diagrammatical illustration in section of a compensatory device according to the invention, showing a first form of embodiment intended for compensory adjustment only.

Figure 2:
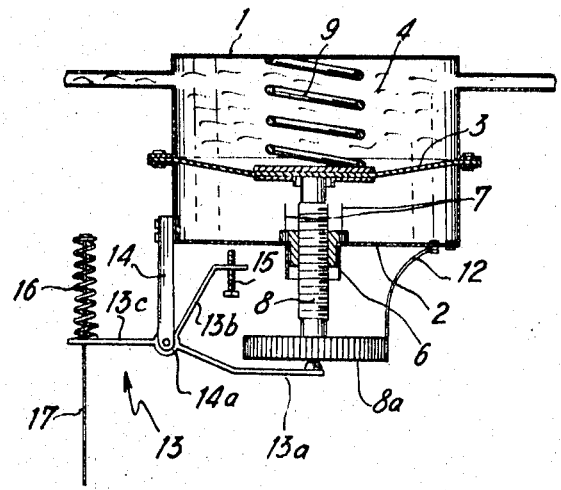

FIG. 2 a illustrates a second form of embodiment of a device according to the invention, organized for control and compensatory adjustment.

In carrying the invention into effect according to one convenient mode, by way of example, the device of FIG. 1 comprises a case formed by two semihousings 1 and 2 joined together by means of two peripheral flanges 1a, 2a. Between the two flanges 1a and 2a is gripped a diaphragm 3, which is pliable and hermetic. The semihousing 1 and the diaphragm 3 thus define an enclosure 4, of variable volume, which may be placed in communication with the hydraulic circuit which is to be kept in a state of balance. In the example illustrated, the enclosure 4 is shown in series in the hydraulic circuit with an inlet 1b and outlet 1c. The enclosure 4 could however be tapped into the circuit by means of a single communicating orifice.

In opposition to the diaphragm 3, the semihousing 2 has an opening 2a in which is installed a nut 6 having a step or shoulder 6a adapted to bear against the inner side of the case 2, around the entire opening 2a. In the shoulder 6a of the nut are formed at least two guide drillings 6b parallel to the axis of the nut which mate with guiding pins or studs 7 secured to the case 2. The nut 6 may thus displaced parallel to its axis and at right angles to the diaphragm 3 towards the inside of the case but is restricted from rotation about its axis. Many other conventional guiding systems could evidently endow the nut 6 with an analogous degree of freedom.

An adjusting screw 8 having a knurled head 8a external to the case, operates in conjunction with the nut 6. A spring 9 having one end bearing against the side of the semihousing 1 opposite to the diaphragm 3 and the other end against a thrust plate 10 linked to the diaphragm, always tends to thrust the diaphragm 3 against the extremity 8b of the screw 8 through a counterplate 11, this counterplate contingently being centrally equipped with a circular rim or flange 11a employed to guide the extremity 8b of the screw. Finally, a flexible blade 12 is fastened on the semihousing 2 and its extremity 12a exerts retaining pressure on the knurled head 8a.

The operation of the device is as follows. The enclosure 4 is incorporated in the hydraulic circuit which is to be kept in a state of balance as specified above. The spring 9 thrusts the diaphragm 3 against the screw 8 and by means of the screw holds the nut 6 against the inner side of the semihousing 2, and this irrespective of the d epth of engagement of the nut 6 on the screw 8. The volume of the enclosure 4 is caused to vary by screwing the screw 8 into or out of the nut 6 to a greater or lesser degree, in order to effect appropriate adjustment of the orientation of the headlights coordinated with the device of the invention and controlled by means of the said hydraulic circuit. Also, in case of malfunction owing to a reduction in the quantity of liquid contained in the circuit by leakage or evaporation, or else to a local or overall change in temperature in the circuit, renewed adjustment by means of the screw 8 renders it possible to balance this reduction.

It will be realized that in such a compensatory application of the device according to the invention, the possibility of sliding the nut 6 relative to the case has not been exploited. The nut 6 could well be fixed to the case, or may be formed by a female screwthread solidary with the latter.

The said possibility may be exploited in another form of application of the device according to the invention in which the said device is exploited as a controlling and adjusting element.

A mode of operation of this nature is illustrated in FIG. 2.

The device of FIG. 2 is analogous to that of FIG. 1, and as a complementary element, comprises a lever 13 arranged pivotally on the extremity 14a of a bearer or bracket 14 fastened on the semihousing 2. This lever comprises three arms 13a, 13b, 13c. The extremity of the arm 13a bears against the knurled head 8a of the screw 8. The extremity of the lever 13b rests in adjusting abutment against the outer surface of the semihousing 2 with intercalation of an adjusting screw 15. The extremity of the arm 13c is linked elastically by a damping spring 16 to a control rod or cable 17.

The operation of a device of this kind, when employed for compensatory purposes, is the same as that set forth in respect of that of FIG. 1: compensatory adjustment is effected by displacing the screw 8 with respect to the nut 6, the latter remaining stationary, the extremity of the arm 13a of the lever 13 remaining in contact with the head 8a of the screw 8, under the action of the spring 16 tending to pivot the lever 13 as a whole around the pivot pin 14a. In the position illustrated in FIG. 2 (shoulder 6a of the nut 6 in contact with the side of the semihousing 2), the headlights controlled by the hydraulic circuit occupy a certain setting, for example, the "high" position. To move the headlights to the other setting ("low position"), the driver causes the lever 13 to pivot around 14a by acting on the pull 17. In this movement, the extremity of the arm 13a exerts a guided thrust on the screw 8 and the nut 6, causing a displacement of the diaphragm and a change in the volume of the enclosure 4. This change in volume is calculated to cause the required change in the orientation of the headlights. The limit of the control stroke between the two setting positions defined in the preceding, is established by the extremity 15a of the screw 15 coming into contact with the side of the semihousing 2.

The pull 17 is connected to the dashboard of the vehicle, in a suitable and conventional manner. It will be realized that although the device of FIG. 2 has been described as a control device for setting between two positions (a "high" position, and a "low" position), it may equally be arranged as a continuously operating device. This possibility is particularly advantageous if the inclination of the headlights is to be adjusted progressively according to the load of the vehicle.

The invention is evidently not limited to the particular forms of embodiment described and covers all modified forms within its scope. In particular, the control element coordinated with the device of FIG. 1 to convert the same, as illustrated in FIG. 2, into a controlling balancing or compensatory device, may be another element than a pivoting lever, although the latter represents a preferred feature. A pivoting lever need not necessarily comprise three branches: branch 13b could be omitted and replaced by another thrust or abutment element, for example one solidary with the nut 6. Finally, the pull 17 could be actuated direct by the relative displacements between the sprung and unsprung portions of the vehicle, to cause direct and automatic variation in the orientation of the headlights as a function of the riding position of the vehicle.

I claim:

1. A balancing device for an hydraulic system which comprises:

a casing;

a diaphragm mounted in said casing which completes a sealed enclosure within said casing, said enclosure being adapted to be connected to an hydraulic circuit;

a spring disposed within said enclosure urging said diaphragm to increase the volume of said enclosure;

said casing having elongated slide guide means extending normal to said diaphragm, adjusting means adapted to bear against said diaphragm in opposition to said spring means, said adjusting means comprising a screw threadably engaging a nut in said casing, said nut being in casing slidably secured on said guide means for movement and in the direction of the center of said diaphragm, the arrangement being such that the nut is prevented from rotation with respect to said casing and is held in position under the pressure of said spring means acting on said adjusting means whereby the volume of said enclosure may be adjusted by rotational displacement of said adjusting means and by sliding displacement of said nut.

2. The device claimed in claim 1 wherein said spring means and said adjusting means bear against said diaphragm through guiding and abutment elements.

3. The device of claim 2 further including a control element engaging said adjusting means and adapted to initiate a predetermined sliding displacement of said adjusting means whereby the volume of said enclosure may be varied by a predetermined amount.